US006113746A

United States Patent [19]

Hack et al.

[11] Patent Number: 6,113,746

[45] Date of Patent: Sep. 5, 2000

[54] METHODS FOR ALTERING THE MAGNETIC PROPERTIES OF MATERIALS AND THE MATERIALS PRODUCED BY THESE METHODS

[75] Inventors: Jonathan A. Hack, South Miami; Rolf E. Hummel; Matthias H. Ludwig, both of Gainesville, all of Fla.

[73] Assignee: University of Florida, Gainesville, Fla.

[21] Appl. No.: 08/979,590

[22] Filed: Nov. 26, 1997

Related U.S. Application Data

[60] Provisional application No. 60/032,311, Nov. 27, 1996.

[51] Int. Cl.$^7$ .......... C07F 9/02

[52] U.S. Cl. .......... 204/157.74; 205/164

[58] Field of Search .......... 204/157.15, 157.74, 204/164

[56] References Cited

U.S. PATENT DOCUMENTS

| | | | |
|---|---|---|---|
| 2,257,177 | 9/1941 | Luster | 204/168 |
| 4,328,258 | 5/1982 | Coleman | 427/39 |
| 4,379,960 | 4/1983 | Inoue | 219/69 |
| 4,400,410 | 8/1983 | Green et al. | 427/39 |
| 4,416,751 | 11/1983 | Berkowitz et al. | 204/165 |
| 4,624,859 | 11/1986 | Akira et al. | 427/38 |
| 4,917,785 | 4/1990 | Juvan | 204/164 |
| 5,077,027 | 12/1991 | Vesa-Pekka et al. | 423/342 |
| 5,397,429 | 3/1995 | Hummel et al. | 156/643 |

OTHER PUBLICATIONS

Laiho, R., E. Lähderanta, L. Vlasenko, M. Vlasenko, M. Afanasiev (1993) "Magnetic properties of light–emitting porous silicon" Journal of Luminescence 57:197–200 no month available.

*Primary Examiner*—Kathryn Gorgos
*Assistant Examiner*—Erica Smith-Hicks
*Attorney, Agent, or Firm*—Saliwanchik, Lloyd & Saliwanchik

[57] ABSTRACT

Methods for altering the magnetic properties of materials and the novel materials produced by these methods. The methods concern the application of high voltage, high frequency sparks to the surface of materials in order to alter the magnetic properties of the materials. Specificaly this method can be applied to diamagnetic silicon to produce ferromagnetic spark-processed silicon.

21 Claims, 1 Drawing Sheet

METHODS FOR ALTERING THE MAGNETIC PROPERTIES OF MATERIALS AND THE MATERIALS PRODUCED BY THESE METHODS

This application claims benefit of Provisional application Ser. No. 60/032,311 filed Nov. 27, 1996.

BACKGROUND OF THE INVENTION

A material's magnetic properties pertain generally to how the material behaves when exposed to magnetic fields. There are several commonly recognized types of magnetic material including diamagnetic, paramagnetic, ferromagnetic, antiferromagnetic, ferromagnetic, and superparamagnetic. The main characteristics of each type are overviewed in *Engineering Electromagnetics* (Hayt, Jr., William H., pg 306–310) and are described below for the three most common types.

Diamagnetic materials have atoms which have no permanent magnetic moments. Specifically, the electron spins and orbital motions balance out within each atom such that the net moment of each atom is zero. When a diamagnetic material is exposed to an external magnetic field, the external magnetic field induces magnetic moments in each atom which are directed opposite to the external magnetic field. This alignment of atomic moments decreases the magnitude of the internal magnetic field within the material below the magnitude of the applied field.

Paramagnetic materials have atoms which each have a small magnetic moment, but the random orientation of the atoms within the material produces an average magnetic moment of zero. When an external field is applied, the moment of each atom tends to align with the external field. This alignment of atomic moments increases the magnitude of the magnetic field within the material above the magnitude of the applied external field.

In ferromagnetic materials each atom has a relatively large dipole moment caused primarily by uncompensated electron spin moments of electrons, for example, in the d and f shells. Interatomic forces cause these moments to line up in a parallel fashion over regions called domains. Prior to applying an external field, each domain will have a strong magnetic moment. However, due to cancellation of domain moments, which vary in direction, the material as a whole has no magnetic moment. Upon applying an external magnetic field, the domains with moments in the direction of the external field get larger while the other domains get smaller and, therefore, the magnitude of the magnetic field within the ferromagnetic material gets much larger than the magnitude of the applied external field. Furthermore, upon removing the external magnetic field a residual dipole field remains in the material. Each ferromagnetic material is characterized by a hysteresis loop which represents the relationship between B, the magnization of the material, and H, the applied external field.

The magnetic properties of a material can greatly affect the utility of the material. Accordingly, the utility of materials can be greatly extended by changing their magnetic properties. Well known uses of magnetic materials include transformers, electric motors, electromagnets, micromachine parts, and magnetic tags. For example, micromachines, which incorporate the movement of micron-scale parts, currently must be made from iron compounds because these materials have the necessary magnetic characteristics. It would be highly advantageous to have other materials having the necessary magnetic properties for use in micromachines or other applications where magnetic materials are needed. In particular, it would be advantageous to have a magnetic material which is similar and integrated with the substrate material upon which it is situated.

One material which forms the basis for many high technology applications is silicon. There are a variety of forms of silicon which are used in various applications. For example, porous silicon, which can be made by, for example anodic etching, can be used for applications requiring photoluminescing. Another form of silicon is known as amorphous silicon. Silicon oxides ($SiO_x$) are also important materials in many applications.

One form of silicon which has been recently described is spark-processed silicon (sp-Si). Spark processing, which is described in U.S. Pat. No. 5,397,429 creates a silicon oxide material. This silicon oxide material which is distinct from porous silicon, is known to photoluminesce. U.S. Pat. No. 5,397,429 does not disclose or suggest that spark processing of silicon has any effect on the magnetic properties of that material.

Natural silicon is a diamagnetic material. Porous silicon is thought to be weakly ferromagnetic as is amorphous silicon.

The ability to efficiently modulate the magnetic properties of silicon materials and other materials would be highly advantageous and would make it possible to significantly extend the useful properties of these materials.

BRIEF SUMMARY OF THE INVENTION

The subject invention concerns processes for altering the magnetic properties of materials. Specifically exemplified herein are methods for altering the magnetic properties of silicon and/or silicon-related compounds including the various forms of silicon and silicon oxides. The methods of the subject invention are also applicable to many other materials. The subject invention concerns not only the unique and advantageous methods described herein but also the novel materials produced by these methods.

In a further embodiment the subject invention pertains to the use of the unique materials produced in accordance with the procedures described herein. These materials can be used in a variety of applications requiring specific magnetic properties.

In a preferred embodiment, the methods of the subject invention involve altering the magnetic properties of a material by subjecting the material to a spark processing technique. Typically, the spark processing will comprise the administration of high voltage sparks to the material. Material is flash evaporated by the sparks and, during the intervals between the sparks, a material with altered magnetic properties, formed of the flash evaporated material, is deposited on the new surface. This newly-deposited material exhibits magnetic properties which differ from the original material.

DETAILED DISCLOSURE OF THE INVENTION

Figure 1:
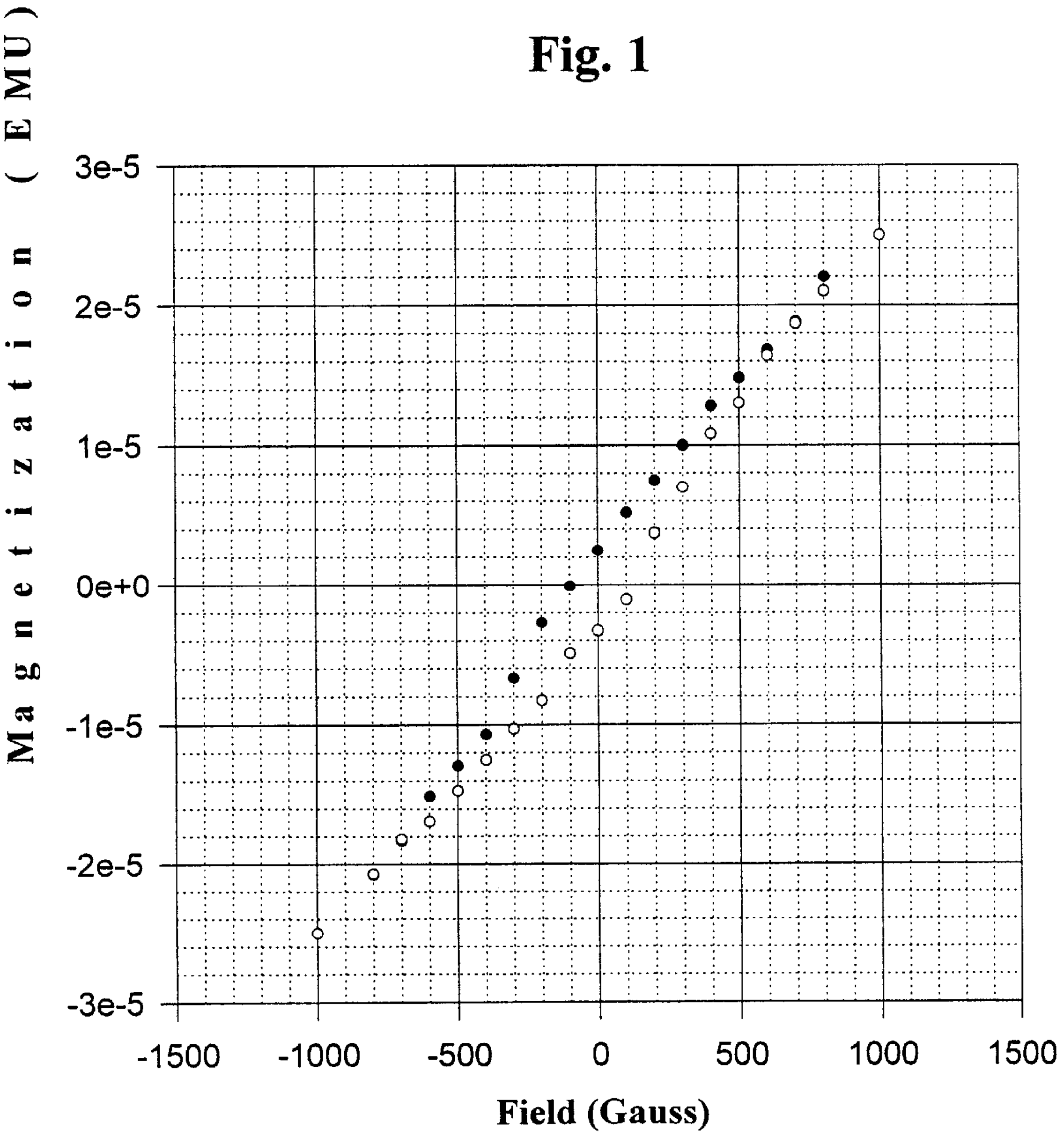
FIG. 1 shows a hysterisis loop of ferromagnetic spark-processed silicon (sp-Si).

The subject invention concerns processes for altering the magnetic properties of materials. Specifically exemplified herein are methods for altering the magnetic properties of silicon. Unless indicated otherwise, reference herein to "silicon" includes the various forms of silicon and its oxides. The methods of the subject invention are also applicable to many other materials. The subject invention concerns not only the unique and advantageous methods described herein but also the materials produced by these methods.

The subject process can be applied to, for example, diamagnetic, paramagnetic, and ferromagnetic materials. The magnetic properties of diamagnetic materials such as silicon, silicon oxides, germanium, arsenic, selenium, gallium arsenide, gallium phosphide, and other alloys can be altered using the subject method. The magnetic properties of paramagnetic materials such as chromium, copper, zinc, gold, silver, niobium, molybdenum, tungsten, platinum, tin, indium, and alloys containing these and other elements can also be altered using the subject processing techniques. The subject process can also be applied to ferromagnetic iron alloys and alloys of cobalt and nickel.

In one embodiment of the subject invention, diamagnetic materials, for example silicon, can be converted into ferromagnets. Alternatively, the paramagnetic properties of paramagnetic materials, for example chromium, can be greatly enhanced using the procedures of the subject invention. By applying the method of spark processing to specific precursors, tailored magnetic materials can be fabricated.

Spark processing is a technique that forms a magnetic thin surface layer with a high degree of amorphization. Ferromagnetic layers can be produced on wafers, for example silicon, by the application of repetitive sparks from a spark generating device. In one embodiment, the process can be performed in ambient atmosphere at room temperature. Alternatively, specific gas atmospheres, for example nitrogen, and/or different temperatures may be used. During spark processing, very high temperatures are produced and extremely rapid quenching is achieved. A person skilled in the art, having the benefit of the instant disclosure, will appreciate that other processing techniques, which create the same relevant conditions as those created by spark processing can be used according to the subject invention. For example, laser treatment of materials to achieve flash evaporation and rapid quenching can also be used according to the subject invention.

In a specific example, when silicon, normally a diamagnetic material, is spark processed, the resultant spark-processed silicon (sp-Si) is ferromagnetic. In one embodiment, spark-processed silicon (sp-Si) is produced in a procedure whereby a portion of a high purity single crystal silicon wafer is flash evaporated using a series of high voltage (15 KV) and low current (1–2 mA) sparks and, during the intervals between sparks, a material having new magnetic properties is deposited on the remaining silicon substrate. The material which is deposited is known as sp-Si and, in one embodiment, can be represented as $SiO_x$:N. The deposited material has a high defect density. Since there is no metal in this material, sp-Si is unique in that it represents a ferromagnetic glass. The method, for example, can produce ferromagnetic layers on p-type, n-type, low-doped, high-doped or undoped silicon wafers.

Any high frequency, high voltage spark generator device is suitable to provide the sparks necessary to process the material as described herein. The voltage applied should be high enough to flash evaporate a portion of the subject material and not so high that it melts the material faster than the material can quench back into a solid. Typically, applied voltages range from about 1,000 to about 30,000 volts. Preferably, the voltage will be between about 5,000 and about 20,000 volts, and most preferably between about 10,000 and about 15,000 volts. The amperage of the current can range from about 0.1 milliampere to about 1 amp. Preferably the amperage will be between about 1 milliampere and about 5 milliamperes, and most preferably between about 1 milliampere and about 3 milliamperes. The frequency of the sparks can range from about 1000 to about 30,000 hertz. Preferably the frequency will be between about 5,000 and about 20,000 hertz, and most preferably between about 10,000 and about 15,000 hertz. For example, a high frequency, high voltage, low current Tesla coil capable of producing approximately 1,000 to 30,000 volts at frequencies of at least one kilohertz, with currents ranging from about 1 milliamp to about 1 amp can be utilized. Preferably, voltages of at least 10,000 volts and frequencies of at least 10 kilohertz are used.

In general, the greater the voltage and the frequency, the more rapidly the ferromagnetic layer is formed. Sparking for extended periods while not significantly affecting the luminescing properties, enhances the quantity of magnetic material. Thus, sparking for varied durations can result in tailored magnetic materials.

The spark can be generated between the grounded wafer and any standard electrode tip, such as a tungsten tip. In a preferred embodiment, the electrode tip can be made from a piece of wafer material which forms a sharp point, eliminating the possible introduction of impurities from the metal tip. Alternatively, the spark can be generated between two wafers which also eliminates the possible introduction of impurities from the metal tip. Most preferably the spark is generated between an anode tip comprised of a material similar to the bulk material to eliminate contamination. In a specific embodiment, during spark processing, an anode tip can be separated from a cathode substrate and a high voltage applied. This causes a spark to be generated between the anode tip and the cathode material. The electric field forces electrons from the cathode material and ionizes gas molecules on their way to the anode creating a plasma channel. Very high temperatures can be generated in this process, on the order of 30,000 K within about $10^{-7}$ seconds. The gas ions then accelerate toward the cathode. When the gas ions impact the cathode they have sufficient energy to evaporate a certain volume of the cathode material in a flash evaporation. In the off time of the spark event the vaporized material rapidly quenches and forms a highly disordered material. The high temperatures, ie., on the order of 30,000 K, and rapid quenching achieved with this process results in small magnetic domains in the magnetically altered material.

In the case of spark-processed silicon, the surface to volume ratio and the depth of the ferromagnetic layer, as well as the shape of the hysterisis loop are functions of the treatment time, voltage and frequency. The depth of the ferromagnetic layer eroded at the same voltage and frequency varies with the time of treatment. The depth of the ferromagnetic layer can range, for example, from as little as about 2 microns for a 10 minute treatment up to about 500 microns for 96 hour treatment. Silicon crystallites produced by the spark processing may range from about 3 to about 125 nanometers in diameter and pore size can range from about 10 to about 2000 nanometers. High resolution TEM micrographs reveal randomly oriented, nanometer-scale silicon crystallites embedded in an amorphous silicon dioxide matrix. Contrary to the diamagnetic signal known for bulk silicon, sp-Si displays a paramagnetic response as well as a ferromagnetic hysteresis loop. Referring to FIG. 1, a hysterisis loop of ferromagnetic spark-processed silicon (sp-Si), spark processed in accordance with the subject invention, is shown.

The process of the subject invention can also significantly enhance the paramagnetism of a naturally paramagnetic material, for example chromium.

Currently, considerable research is being directed towards micromachines and microactuators for use in, for example, computer chips. By integrating magnetic materials into a computer chip, analog computing can be realized. Specifically, by applying a magnetic field near a moveable magnetic material placed on a computer chip, the magnet can be adjusted to any position in two dimensions. The resultant position can be used as an analog data storage system. Spark processed ferromagnetic silicon is an excellent material for this application because it is a soft ferromagnet with small scale dimensions and can be produced from material similar to the chip itself. This allows excellent matching of thermal and electrical properties between chip and magnet, as well as minimization of contamination of the chip from the magnet. Micromachines further require soft magnetic cores, and spark processed ferromagnetic silicon is an excellent material for this purpose.

Since the magnetic properties of materials in general can be significantly altered through spark processing, a host of new materials is possible. Typically amorphous thin magnetic films have been fabricated via spin casting. This technique exploits rapid cooling rates and quenches in the amorphous state in a material. However, cooling rates can be slow and thus the magnetic domains may grow larger than desired. Spark processing is an extreme form of quenching, and can form highly amorphous, defect laden materials with domains much smaller than currently available. Since magnetic memory density is limited by domain size, reducing domain size, can greatly enhance memory density.

Spark processing can produce soft magnetic materials easily demagnetized with small fields. These materials are excellent for magnetically tagging items. The magnets can be "switched on and off" by applying small fields. In addition, by applying large magnetic fields to spark processed materials, it is possible to permanently destroy the magnetic behavior of the material. Thus, a material can be temporarily tagged, and then, after application of a large magnetic field, remain nonmagnetic thereafter.

Spark-processed materials with ferromagnetic properties, e.g., sp-Si, have many uses. For example, ferromagnetic spark-processed materials can be used in micromachines for gears, and motors in the form of microactuators. Specifically, a part comprising spark-processed ferromagnetic material in a micromachine can experience a force or be moved by subjecting the part to a magnetic field, while spark-processed ferromagnetic material may be introduced into motors to enhance the magnetic fields resulting from input currents and therefore enhance the performance of the motors. Similarly, an electric current can be circulated, for example via a coil, around a piece of ferromagnetic spark-processed material to generate a magnetic field which is larger than the magnetic field would result without the presence of the spark-processed material. Pieces of ferromagnetic spark-processed materials, e.g., sp-Si, can be placed on items as ferromagnetic markers, wherein when the items are present in a time-varying magnetic field, for example an interrogation zone, the markers will generate a corresponding time-varying magnet field which can be detected by a receiver to signify the presence of the item within a certain region of space, for example an interrogation zone.

Following are examples which illustrate procedures for practicing the invention. These examples should not be construed as limiting. All percentages are by weight and all solvent mixture proportions are by volume unless otherwise noted.

EXAMPLE 1

The ferromagnetic properties of sp-Si can be evaluated using a Superconducting Quantum Interference Device (SQUID). Measurements utilizing a SQUID magnetometer revealed that sp-Si displays ferromagnetic ordering with a saturization magnetization occurring at fields as high as 2000 G. This is attributed to the high density of paramagnetic centers. As a reference, a bulk piece of silicon was measured and the expected diamagnetic signal was observed. Then a similar piece of sp-Si was tested under similar conditions, producing the ferromagnetic hysterisis loop shown in FIG. 1. It appears the hysterisis is saturated at fields above 700 Gauss.

EXAMPLE 2

To determine if the ferromagnetism in spark processed silicon was caused by impurities, a test for magnetic impurities was conducted. In addition, the magnetic strength of the material was measured. First, a sp-Si sample was measured. Subsequently, the sample was annealed at 200° C. intervals and measured in the SQUID. The magnetization strength decreased dramatically after the 400° C. anneal and was essentially absent after the 600° C. anneal. Further annealing at 800° C. and 1000° C. brought the sp-Si sample's magnetic behavior close to that of bulk silicon, i.e., diamagnetic. This demonstrated that spark processing created ferromagnetic material. However, above some critical temperature, the material is physically altered, thereby permanently quenching the ferromagnetic behavior. It is believed these results rule out the possibility of magnetic contaminates, since annealing should not significantly alter an impurity's magnetic behavior. Therefore, sp-Si is the source of the ferromagnetism.

EXAMPLE 3

Electron Paramagnetic Resonance (EPR) studies were conducted on sp-Si to investigate the paramagnetic defect density in the material. An annealing schedule similar to that described in Example 2 was conducted. The samples showed many defects, with a two peak structure showing a high concentration of at least two distinct paramagnetic centers having g values of 2.006 and 2.0036, respectively. With successive anneals, the total defect density decreased similarly to the decrease in the ferromagnetic signal. Moreover, after the 600° C. anneal, the two peak structure was destroyed, leaving only one peak. This suggests that one of the defect species is responsible for the ferromagnetism.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A method for modulating the magnetic properties of a material other than silicon wherein said method comprises applying to said material sparks of sufficiently high voltage to effect said modulation of said magnetic properties.

2. The method, according to claim 1, wherein said method converts said material from nonferromagnetic to ferromagnetic.

3. The method, according to claim 1, wherein said method enhances the paramagnetic properties of said material.

4. The method, according to claim 1, wherein said method enhances the ferromagnetic properties of said material.

5. The method, according to claim 1, wherein the voltage of said sparks is between about 1000 volts and about 30,000 volts.

6. The method, according to claim 1, wherein the voltage of said sparks is between about 5,000 volts and about 20,000 volts.

7. The method, according to claim 1, wherein the voltage of said sparks is between about 10,000 volts and about 15,000 volts.

8. The method, according to claim 1, wherein the frequency for the sparks is between about 1,000 hertz and about 30,000 hertz.

9. The method, according to claim 1, wherein the frequency of the sparks is between about 5,000 hertz and about 20,000 hertz.

10. The method, according to claim 1, wherein the frequency of the sparks is between about 10,000 hertz and about 15,000 hertz.

11. The method, according to claim 2, wherein said material is selected from the group consisting of silicon oxide, germanium, arsenic, selenium, gallium arsenide, or gallium phosphide.

12. The method, according to claim 3, wherein said material is selected from the group consisting of chromium, copper, zinc, gold, silver, niobium, molybdenum, tungsten, platinum, tin, indium, or an alloy containing at least one of these elements.

13. The method according to claim 1, wherein upon applying sparks to a surface of said material, portions of said material are flash evaporated by the sparks and, during the intervals between the sparks, a material with modulated magnetic properties, formed of the flash evaporated material, is deposited on said surface of said material.

14. The method according to claim 1, wherein said sparks are applied to said material in an ambient atmosphere.

15. The method according to claim 1, wherein said sparks are applied to said material in an essentially nitrogen atmosphere.

16. A method for making a silicon material ferromagnetic wherein said method comprises applying sparks of between about 1000 and about 30,000 volts to said silicon, wherein said method creates a surface layer of spark processed silicon of greater than 100 microns.

17. The method, according to claim 16, wherein said sparks are applied to said silicon in an ambient atmosphere.

18. The method, according to claim 16, wherein said sparks are applied in a nitrogen atmosphere.

19. The method, according to claim 16, wherein said method changes the bulk magnetic property of silicon material from nonferromagnetic to ferromagnetic.

20. A method of creating a magnetic field comprising the step of:

circulating an electric current around an object, wherein said object comprises spark-processed silicon.

21. A method of applying a force to an object comprising the step of:

applying a magnetic field to said object, wherein said object comprises spark-processed silicon.

* * * * *

UNITED STATES PATENT AND TRADEMARK OFFICE
CERTIFICATE OF CORRECTION

PATENT NO. : 6,113,746

DATED : September 5, 2000

INVENTOR(S) : Jonathan A. Hack, Rolf E. Hummel, Matthias H. Ludwig

It is certified that error appears in the above-identified patent and that said Letters Patent is hereby corrected as shown below:

Column 1, line 14: "ferromagnetic" should read --ferrimagnetic--.

Column 8, line 21 (Claim 20): "silicon." should read --silicon produced by the method of claim 16.--.

Column 8, line 25 (Claim 21): "silicon." should read --silicon produced by the method of claim 16.--.

Signed and Sealed this

Fifteenth Day of May, 2001

*Attest:*

NICHOLAS P. GODICI

*Attesting Officer* *Acting Director of the United States Patent and Trademark Office*